May 27, 1941.  P. M. BRANNAN  2,243,189
FAN BLADE
Filed June 4, 1937  2 Sheets-Sheet 1
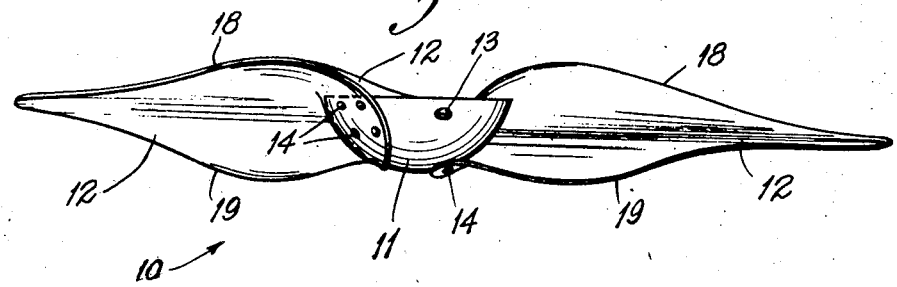
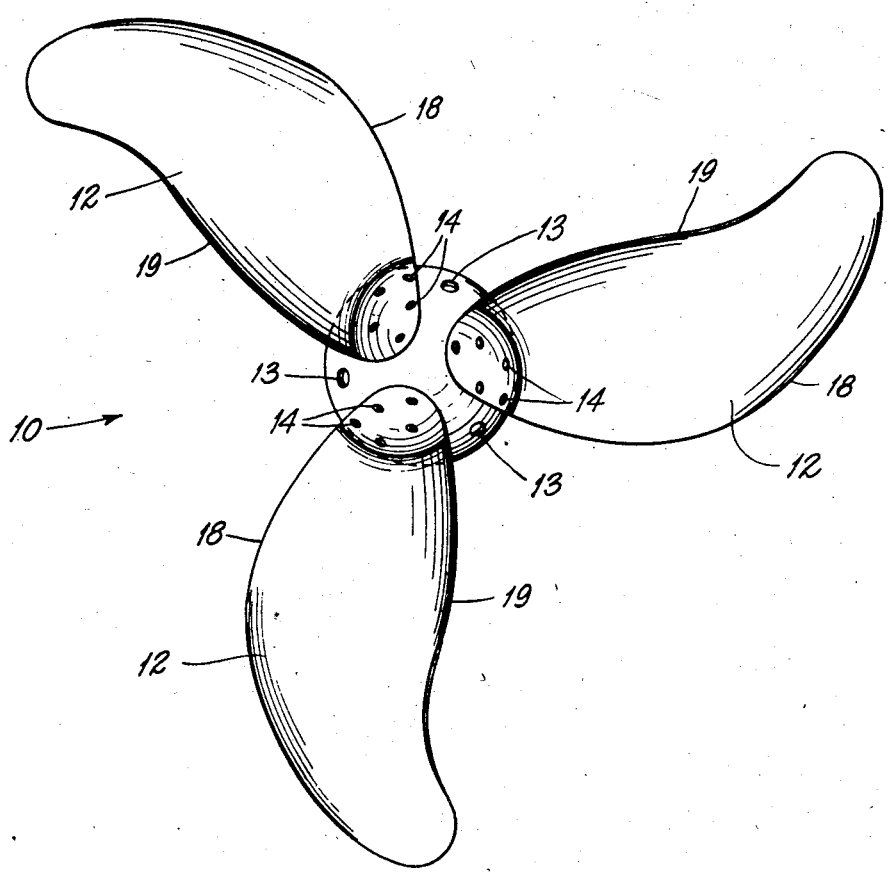
INVENTOR:
PAUL M. BRANNAN,
BY Lawrence C. Kingsland
ATTORNEY.

May 27, 1941.   P. M. BRANNAN   2,243,189
FAN BLADE
Filed June 4, 1937   2 Sheets-Sheet 2
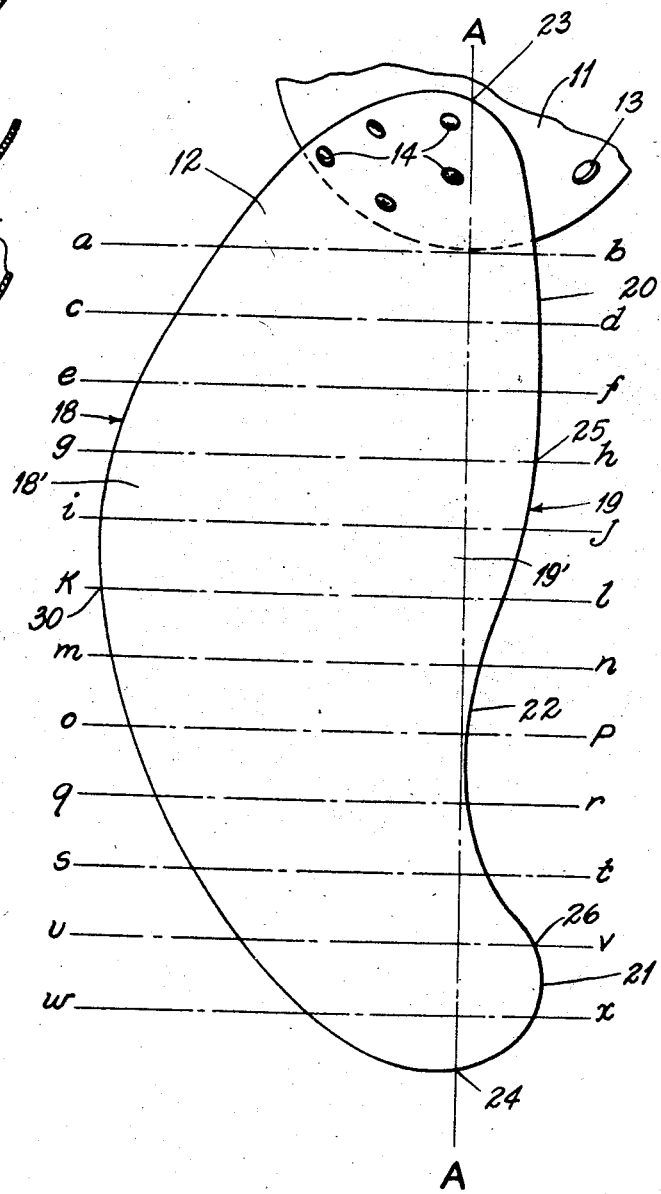
INVENTOR:
PAUL M. BRANNAN,
BY Lawrence C. Kingsland
ATTORNEY.

Patented May 27, 1941

2,243,189

UNITED STATES PATENT OFFICE 2,243,189

FAN BLADE

Paul M. Brannan, St. Louis, Mo., assignor to The Emerson Electric Mfg. Co., St. Louis, Mo., a corporation of Missouri Application June 4, 1937, Serial No. 146,391

6 Claims. (Cl. 170—159)

The present invention relates generally to air circulators, and more particularly to a fan blade assembly and a fan blade.

An object of the present invention is to provide a fan blade which is constructed to throw or impel the major volume of air moved from the surface of the hubward two-thirds of the blade.

Another object is to provide a fan blade which, when in operation, will produce a minimum amount of noise.

Another object is to provide a fan blade, the leading edge of which is convex and the leading edge portion of which decreases in pitch from the inner end to zero at a point substantially half the distance of the blade, after which the pitch is negative to the outer tip thereof.

Another object is to provide a fan blade, the air impelling surface of which is concave or dish-shaped throughout its major portion but which at its outer tip is substantially planar.

Another object is to provide a fan blade which is so constructed that, in comparison with a conventional blade, the normal blade noise is materially decreased, yet in which the maximum air velocity is increased with resultant increase in depth of penetration without increasing the power input or changing the blade speed.

Another object is to provide a fan blade having a trailing portion, the point of maximum pitch of which is between 35% and 45% outwardly from the axis of rotation along the radial length, said trailing portion decreasing in pitch both towards the axis of rotation and towards the free end of the blade.

Another object is to provide a fan blade in which the axial blade displacement reaches a maximum at a point between 0% and 67% of the radial length thereof.

Another object is to provide an improved air circulator including a hemispherical blade supporting-cap and a plurality of air impelling blades.

Other objects and advantages will be apparent from the following description taken in conjunction with the accompanying drawings, in which:

Fig. 1 is a side view of an air circulator assembly constructed according to the present invention.

Fig. 2 is a front view of the air circulator assembly shown in Fig. 1.

Fig. 3 is an enlarged front view of one of the fan blades of the air circulator assembly shown in Fig. 1.

Fig. 4 is a section on the line a—b of Fig. 3;
Fig. 5 is a section on the line c—d of Fig. 3;
Fig. 6 is a section on the line e—f of Fig. 3;
Fig. 7 is a section on the line g—h of Fig. 3;
Fig. 8 is a section on the line i—j of Fig. 3;
Fig. 9 is a section on the line k—l of Fig. 3;
Fig. 10 is a section on the line m—n of Fig. 3;
Fig. 11 is a section on the line o—p of Fig. 3;
Fig. 12 is a section on the line q—r of Fig. 3;
Fig. 13 is a section on the line s—t of Fig. 3;
Fig. 14 is a section on the line u—v of Fig. 3; and
Fig. 15 is a section on the line w—x of Fig. 3.

Referring to the drawings more particularly by reference numerals, 10 indicates generally an air circulator assembly constructed in accordance with the present invention. The air circulator 10 includes a blade supporting cap 11 and a plurality of blades 12. The cap 11 is substantially hemispherical in shape and has spaced apertures 13 through which a suitable tool is adapted to be inserted for the purpose of manipulating a set screw (not shown) forming a part of a supporting base (not shown) for the cap 11. The blades 12 are fixed to the cap 11 by rivets 14, or the like. Three blades 12 are shown, but a greater or lesser number may be used.

In Fig. 3, there is shown on an enlarged scale one of the blades 12. Each blade 12 includes a convex leading edge 18 and a trailing edge 19, the latter of which comprises two spaced convex segments 20 and 21 and an intermediate connecting concave section 22. The leading edge 18 defines the free portion of the periphery of a leading portion 18', while the trailing edge 19 defines the free portion of the periphery of a trailing portion 19'. The inner and outer junctions of the leading edge 18 and the trailing edge 19 are substantially at the points 23 and 24, respectively. A radius AA, which passes through the points 23 and 24, may be called the primary radius of the blade.

A series of section lines a—b, c—d, e—f, g—h, i—j, k—l, m—n, o—p, q—r, s—t, u—v, and w—x mark off on the blade 12 in Fig. 3 the correspondingly indicated sections shown in Figs. 4–15. The surface contours of the blade 12 are thus shown by these sections. An inspection of the sections shows that the portion of greatest pitch in the blade is the trailing edge portion substantially at or slightly hubward of a point 25 on the trailing edge 19. From substantially the point 25 towards the fixed end of the blade along the trailing edge 19 the pitch of the trailing edge decreases slightly. From substantially the point 25 towards the free end of the blade 12 the pitch of the trailing edge decreases to such a degree that from a point 26 outwardly it is almost zero.

Further, the pitch of the edge 19 decreases sufficiently sharply from the point 25 so that the axial blade displacement is a maximum substantially at the point 25 also. The axial blade displacement of air is obtained here and conventionally by the formula $$D = 2\pi \cdot R.P.M. \cdot R \tan \theta$$

where
D is the axial blade displacement,
R is any selected radius
θ is the angle between the trailing portion of the edge of the blade and the direction of motion at distance R from the axis of rotation. Obviously, since the pitch of the trailing edge portion is almost zero at and near the free end of the blade 12 and since the pitch of the leading edge portion is slightly negative at this point, the axial blade displacement will likewise be substantially zero in this area.

The major surface of the blade is concave or dish-shaped in configuration when viewed from its front face. The free end of the blade 12 from the section u—v outwardly is substantially planar.

The blade 12 performs the major portion of its work in that two-thirds nearest the axis of rotation which is contrary to the usual fan blade. The high air velocities, with resultant eddy currents, are confined to an area near the hub, where the peripheral speed of the blade 12 is relatively low. At and towards the tip of the blade 12, where the peripheral speed is high, the air velocities are too low to set up objectionable eddy currents. The construction reduces considerably the blade noise and increases the maximum air velocity with resultant increase in depth of penetration without increasing the power input or changing the speed. The use of negative pitch for the leading edge portion of the blade from the point 30 outwardly to the free tip assists to reduce noise. The maximum width of the blade is along a line transverse to the blade hubward of a line 50% of a radial blade length.

It is thus apparent that there has been provided an air circulator which is adapted to fulfill all of the advantages and objects sought therefor. It is to be understood that the foregoing description and the accompanying drawings have been given by way of illustration and example, and not by way of limitation, the invention being limited only by the following claims.

What is claimed is:

1. A fan blade, said blade comprising a leading portion and a trailing portion, said trailing portion being of maximum pitch at a point substantially 35% to 45% of a radial blade length from the inner end, said trailing portion decreasing in pitch from said point of maximum pitch towards the outer end of the blade, said trailing portion being of substantially zero pitch at and towards the outer end, said leading portion being of negative pitch adjacent said leading edge from a point substantially mid-way between the termini of the leading edge to just short of the outward terminus of the leading edge.

2. A fan blade assemblage including a plurality of blades, each blade being so constructed that the maximum blade displacement is at a point hubward of a point fifty percent. of a radial blade length of such nature that the maximum air velocity and the depth of penetration of the fan are increased without increase in normal blade speed and with decrease in blade noise, said blade including a trailing portion which is of maximum pitch at a point substantially thirty-five percent. to forty-five percent. of a radial blade length from the inner end, said leading portion being of negative pitch adjacent said leading edge from a point substantially mid-way between the termini of the leading edge to just short of the outward terminus of the leading edge, said blade further including a tip portion of substantially zero pitch.

3. A fan blade including a leading edge, a leading portion, a trailing edge, and a trailing portion, said leading portion being of negative pitch adjacent said leading edge from a point substantially mid-way between the termini of the leading edge to just short of the outward terminus of the leading edge, said leading portion being of positive pitch from said point hubward, said trailing portion being of maximum pitch at a point thirty-five percent. to forty-five percent. of a radial blade length from the inner end.

4. A fan blade including a leading edge, a leading portion, a trailing edge, and a trailing portion, said leading portion being of negative pitch adjacent said leading edge from a point substantially mid-way between the termini of the leading edge to just short of the outward terminus of the leading edge, said trailing portion being of increasing pitch from the inward terminus of the trailing edge to an intermediate point substantially 35% to 45% of a radial blade length outwardly, said trailing portion being of decreasing pitch from said intermediate point on the trailing edge to substantially the outward terminus of the leading edge.

5. A fan blade including a leading edge, a leading portion, a trailing edge, and a trailing portion, said leading portion being of negative pitch adjacent said leading edge from a point substantially mid-way between the termini of the leading edge to just short of the outward terminus of the leading edge, said leading portion being of positive pitch from said point hubward, said trailing portion being of maximum pitch at a point thirty-five percent. to forty-five percent. of a radial blade length from the inner end, said blade being of maximum width at a point hubward of a point fifty-percent. of a radial blade length and of a construction to effect the maximum blade displacement of air at said area of maximum width.

6. A fan blade including a leading edge, a leading portion, a trailing edge, and a trailing portion, said leading portion being of negative pitch adjacent said leading edge from a point substantially mid-way between the termini of the leading edge to just short of the outward terminus of the leading edge, said trailing portion being of increasing pitch from the inward terminus of the trailing edge to an intermediate point substantially thirty-five percent. to forty-five percent. of a radial blade length outwardly, said trailing portion being of decreasing pitch from said intermediate point on the trailing edge to substantially the outward terminus of the leading edge, said blade being generally concave throughout the major portion and substantially planar in the tip portion, said blade being of maximum width at a point hubward of a point fifty percent. of a radial blade length and of a construction to effect the maximum blade displacement of air at said area of maximum width.

PAUL M. BRANNAN.